United States Patent
Johnson (10) Patent No.: US 10,252,753 B2
(45) Date of Patent: Apr. 9, 2019

(54) MUD GUARD

(71) Applicant: Husky Liners, Inc., Ann Arbor, MI (US)

(72) Inventor: Kenneth Douglas Johnson, Derby, KS (US)

(73) Assignee: Husky Liners, Inc., Ann Arbor, MI (US)

( * ) Notice: Subject to any disclaimer, the term of this patent is extended or adjusted under 35 U.S.C. 154(b) by 0 days.

(21) Appl. No.: 15/621,428

(22) Filed: Jun. 13, 2017

(65) Prior Publication Data

US 2018/0009485 A1  Jan. 11, 2018

Related U.S. Application Data

(60) Provisional application No. 62/360,152, filed on Jul. 8, 2016.

(51) Int. Cl.
*B62D 25/18* (2006.01)
*B62D 25/16* (2006.01)
*B62J 15/02* (2006.01)
*B62D 25/00* (2006.01)
*B62J 15/00* (2006.01)

(52) U.S. Cl.
CPC .......... *B62D 25/188* (2013.01); *B62D 25/16* (2013.01); *B62D 25/18* (2013.01); *B62J 15/02* (2013.01); *B62D 25/00* (2013.01); *B62J 15/00* (2013.01)

(58) Field of Classification Search
CPC ...... B62D 25/188; B62D 25/18; B62D 25/16; B62D 25/00; B62J 15/02; B62J 15/00
See application file for complete search history.

(56) References Cited

U.S. PATENT DOCUMENTS

| | | | | |
|---|---|---|---|---|
| 4,315,634 A * | 2/1982 | Arenhold | ............... | B62D 25/18 280/851 |
| 4,514,003 A * | 4/1985 | Guy | ......................... | B60R 13/04 24/295 |
| 4,784,430 A * | 11/1988 | Biermacher | ............ | B60R 13/04 24/289 |
| D301,710 S * | 6/1989 | Ward | .......................... | D12/185 |
| 5,360,250 A * | 11/1994 | Wood | .................... | B60P 7/0807 296/39.2 |
| 5,407,229 A * | 4/1995 | Garrett | ................... | B62D 25/18 280/851 |
| 5,417,471 A * | 5/1995 | Kreis | .................. | B60R 16/0239 296/198 |
| 5,472,007 A * | 12/1995 | Malott | .................... | B60P 3/343 135/88.1 |
| 5,732,966 A * | 3/1998 | Menard | .................... | B60D 1/62 280/422 |
| 5,823,571 A * | 10/1998 | Cominsky | ............ | B62D 25/188 280/847 |
| 5,967,553 A * | 10/1999 | Cominsky | ............ | B62D 25/188 280/154 |

(Continued)

*Primary Examiner* — Jacob B Meyer
(74) *Attorney, Agent, or Firm* — Harness, Dickey & Pierce, P.L.C.

(57) ABSTRACT

A mud flap assembly includes a mud flap with a mounting surface and an exposed surface, where the exposed surface is on an opposite side of the mud flap from the mounting surface. A foam tape is adhesively mounted to the mounting surface and a spring clip contacts the exposed surface of the mud flap when the mud flap is mounted to a vehicle so as to compress the foam tape.

20 Claims, 14 Drawing Sheets

(56) References Cited

U.S. PATENT DOCUMENTS

| | | | | |
|---|---|---|---|---|
| 6,202,976 B1 * | 3/2001 | Johnson | B60R 1/04 | 248/476 |
| 6,848,857 B1 * | 2/2005 | McColl | E01F 15/088 | 404/6 |
| 6,938,930 B1 * | 9/2005 | Beach | B62D 25/188 | 280/848 |
| 7,114,749 B2 * | 10/2006 | Ward | B62D 25/18 | 280/848 |
| 7,578,526 B2 * | 8/2009 | Jaeger | B60R 13/04 | 280/154 |
| 8,191,843 B2 * | 6/2012 | Hagino | F16B 2/02 | 248/220.21 |
| 8,635,776 B2 * | 1/2014 | Newberry | B62D 65/16 | 29/897 |
| 8,641,139 B2 * | 2/2014 | Gerken | H05B 3/06 | 219/202 |
| 8,651,528 B2 * | 2/2014 | Earl | B62D 25/18 | 280/847 |
| 8,931,172 B2 * | 1/2015 | Newberry | B62D 65/16 | 29/897 |
| 8,991,868 B2 * | 3/2015 | Ward | B62D 25/163 | 280/154 |
| D808,314 S * | 1/2018 | Johnson | D12/185 | |
| D818,914 S * | 5/2018 | Johnson | D12/185 | |
| 2008/0120914 A1 * | 5/2008 | Fink | E06B 1/56 | 49/469 |
| 2009/0025710 A1 * | 1/2009 | Hogan | F24S 80/30 | 126/652 |
| 2018/0009485 A1 * | 1/2018 | Johnson | B62D 25/16 | |

\* cited by examiner

MUD GUARD

CROSS-REFERENCE TO RELATED APPLICATIONS

This application claims the benefit of U.S. Provisional Application No. 62/360,152 filed on Jul. 8, 2016. The entire disclosure of the above application is incorporated herein by reference.

FIELD

The present disclosure relates to vehicle mud flaps or splash guards.

BACKGROUND

This section provides background information related to the present disclosure which is not necessarily prior art.

Mud flaps or splash guards are installed on vehicles behind the vehicle's tires to intercept water and mud sprayed by the tires. For most vehicles, the mud flap is mounted to the interior of the wheel well and extends directly downward from the wheel well.

SUMMARY

This section provides a general summary of the disclosure, and is not a comprehensive disclosure of its full scope or all of its features.

A mud flap assembly includes a mud flap with a mounting surface and an exposed surface, where the exposed surface is on an opposite side of the mud flap from the mounting surface. A foam tape is adhesively mounted to the mounting surface and a spring clip contacts the exposed surface of the mud flap when the mud flap is mounted to a vehicle so as to compress the foam tape.

In a further embodiment, a mud flap includes a mounting surface with a recess. Foam tape is located in and adhered to the recess such that an outer surface of the foam tape is above the mounting surface.

In a still further embodiment, a method includes adhering a mud flap to a vehicle using foam tape positioned between the mud flap and the vehicle. A spring clip is then applied to the mud flap and the vehicle such that the spring clip is in tension and the foam tape is compressed.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

In the embodiments described below, a mud flap assembly is provided that can be installed without drilling additional holes in a vehicle by using a combination of foam tape and clips. The combination provides synergistic bonding between the mud flap and a fender on the vehicle where the clip compresses the foam tape to maintain the adhesive bond while the foam tape actively resists the compression to keep the clip in tension.

Many mud flaps are made of plastic. Placing a clip on such a mud flap can cause the plastic to "creep" or deform at the point of contact between the clip, causing the plastic to thin. This results in less tension on the clip and can cause the clip to come loose from the fender and the mud flap, thereby releasing the mud flap from the vehicle. The embodiments described below avoid this problem by using foam tape that provides a countering force to the clips to maintain the clips in tension. Many of the embodiments provide a recess for the foam tape on the mud flap. This recess allows the foam tape to compress while also allowing the face of the mud flap to fit tightly against the fender.

In still further embodiments, holes are provided in the mud flap to correspond to holes provided in the fender by the vehicle manufacturer. Additional markings are provided on the mud flap to mark the positions where additional holes can be drilled in the mud flap and fender to further secure the mud flap to the fender if desired.

FIGS. 1-7 provide a back-top perspective view, back view, front view, top view, bottom view, left side view and right side view, respectively, of a first embodiment of a mud flap or mud guard 100. Mud guard 100 includes a mounting region 102 and a projection region 104. Mounting region 102 includes a forward vertical mounting surface 106, a side vertical mounting surface 108 and a lateral mounting surface 110 that are each designed to face and contact a fender on a vehicle when mud guard 100 is installed on the vehicle. Projection region 104 is the portion of mud guard 100 that extends down and outward from the vehicle when mud guard 100 is mounted to the vehicle.

Figure 5:
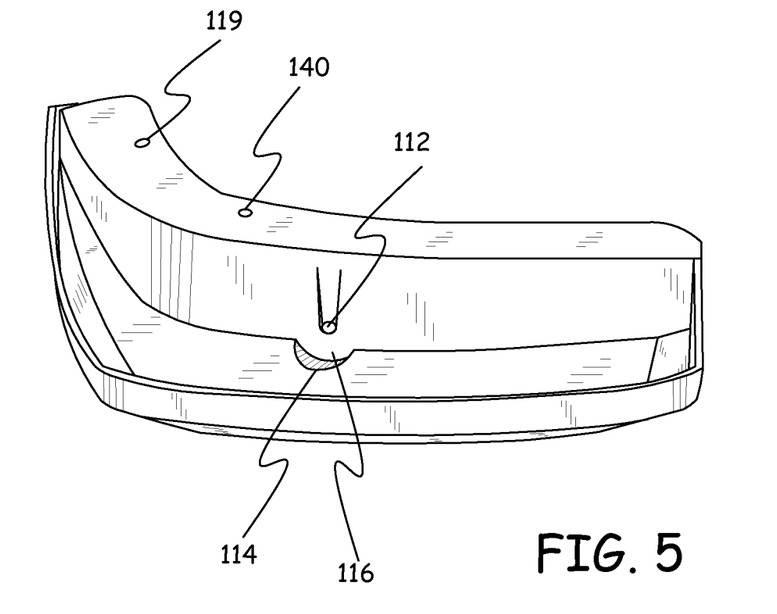
FIG. 5 is a bottom view of the mud flap of FIG. 1.
Figure 6:
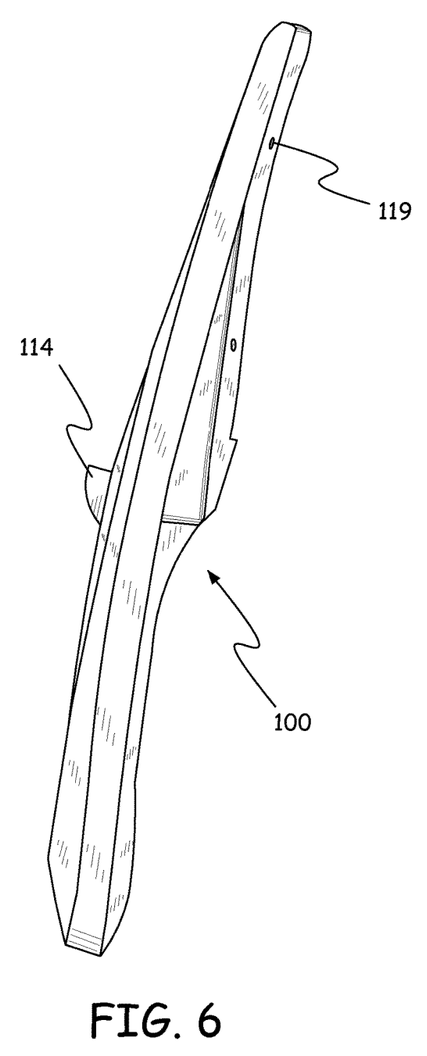
FIG. 6 is a left-side view of the mud flap of FIG. 1.
Figure 7:
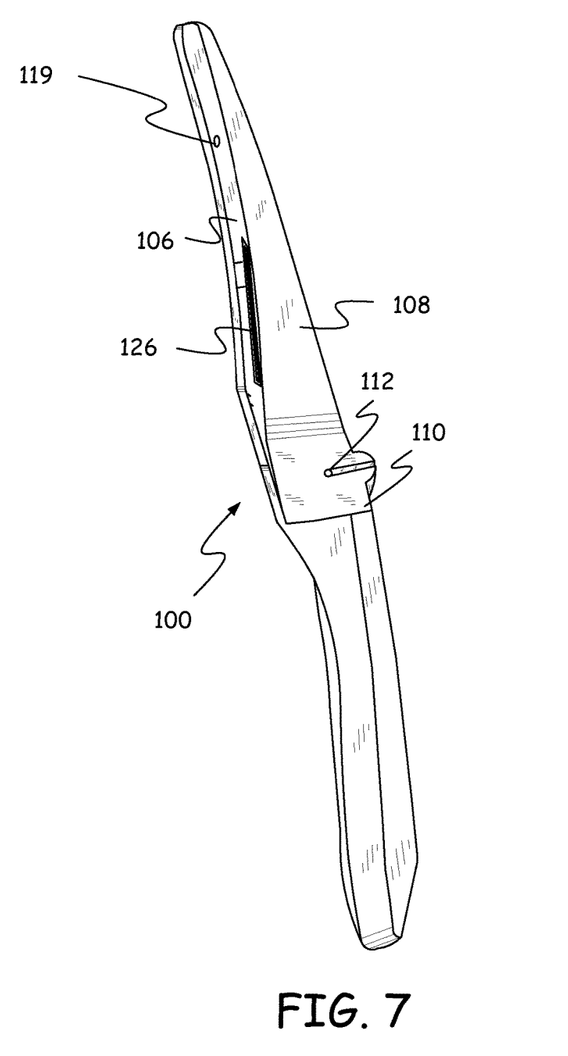
FIG. 7 is a right-side view of the mud flap of FIG. 1.
Figure 8:
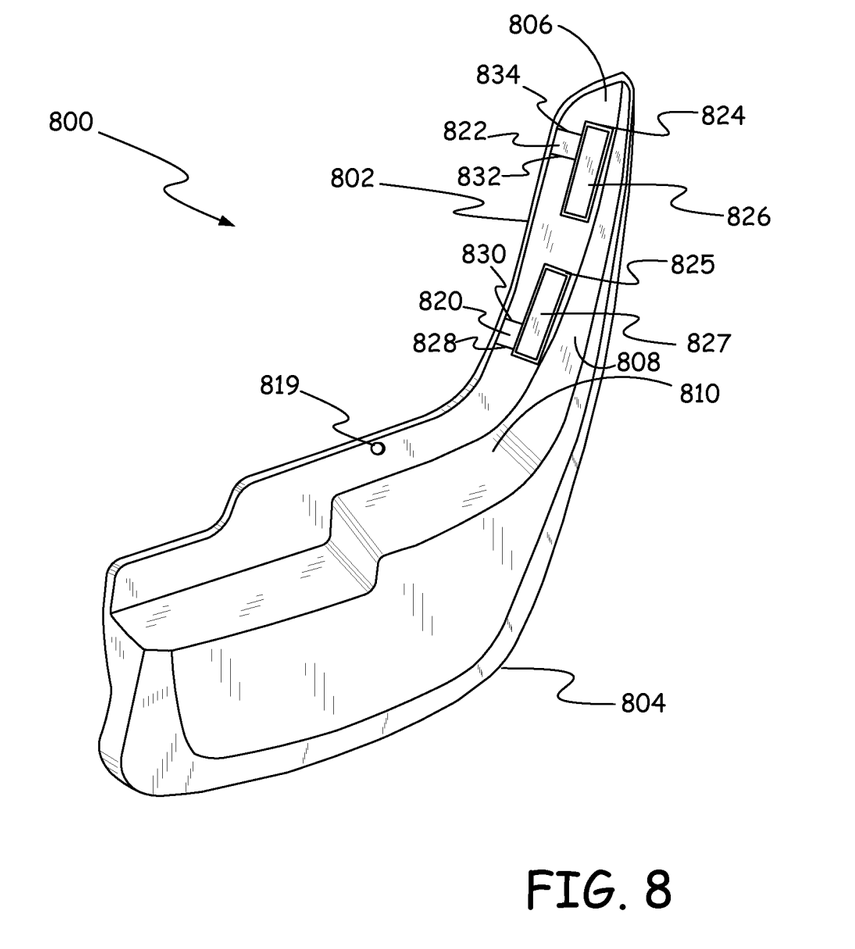
FIG. 8 is a back-top perspective view a mud flap in accordance with a second embodiment.
Figure 9:
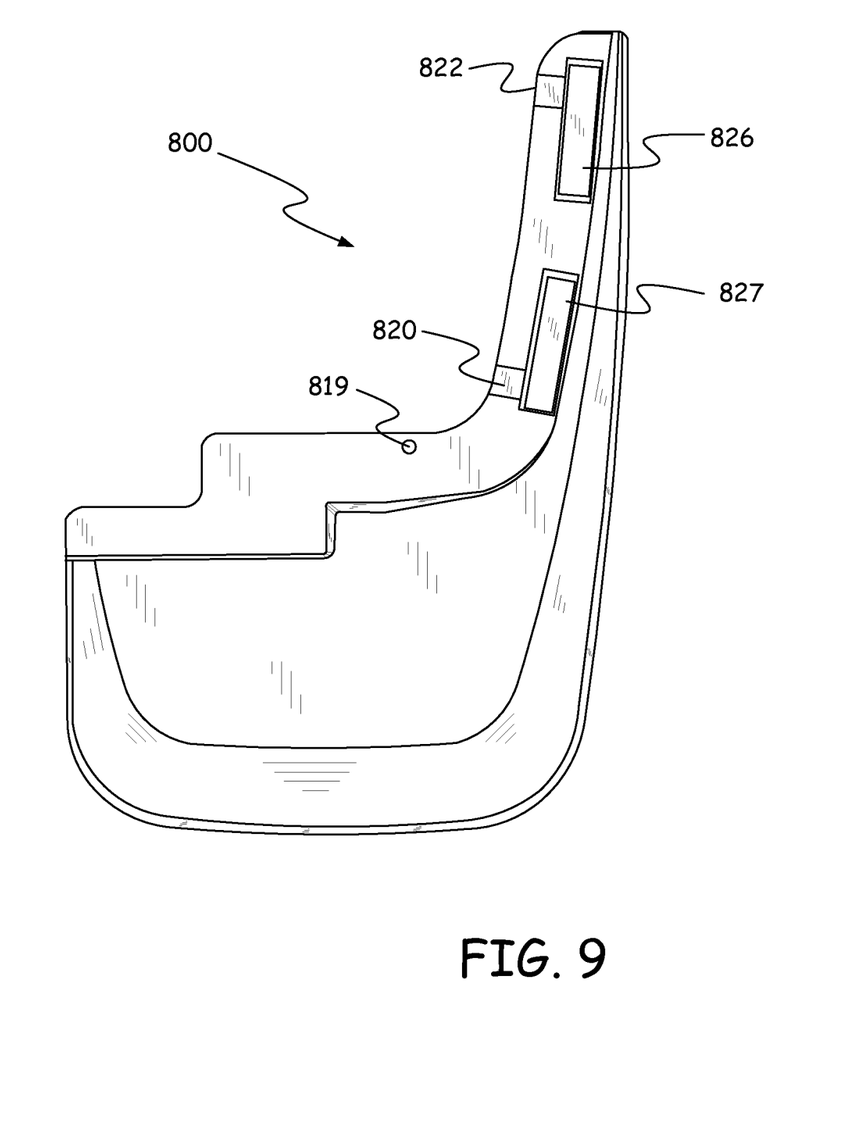
FIG. 9 is a back view of the mud flap of FIG. 8.

Lateral mounting surface 110 includes a mounting through-hole 112 that corresponds to a hole in the fender provided by the manufacturer of the vehicle. A portion of lateral mounting surface 110 is formed by a bump-out 114 that is a semi-circular projection with a center at the center of through-hole 112. As seen in FIG. 5, bump-out 114 provides a space 116 to accommodate a washer or fastener head associated with a fastener that passes through through-hole 112 to mount mud guard 100 to a fender.

Vertical mounting surface 106 includes through-hole 119, two clip regions 120 and 122, a recess 124 and foam tape 126. Through-hole 119 corresponds to a hole in the fender provided by the manufacturer of the vehicle and can receive a fastener to mount mud guard 100 to the fender. Clip region 120 is marked by raised lines 128 and 130 and clip region 122 is marked by raised lines 132 and 134. Clip regions 120 and 122 designate the general location for clips on the mud guard. Although raised lines 128, 130, 132 and 134 are shown on vertical mounting surface 106, the clips, described below, do not contact vertical mounting surface 106 but instead contact exposed surface 142 (FIG. 3), which is on the opposite side of mud guard 100 from vertical mounting surface 106.

Foam tape 126 is a compressible foam with a layer of adhesive on each of two opposing sides. One layer of adhesive bonds the foam tape to vertical face 106 and the other layer of adhesive bonds to the fender. As discussed further below, when mud guard 100 is mounted to a fender, foam tape 126 provides a countering force to the clips used to hold the mud guard on the fender and thereby improves the holding ability of the clips over time.

Figure 3:
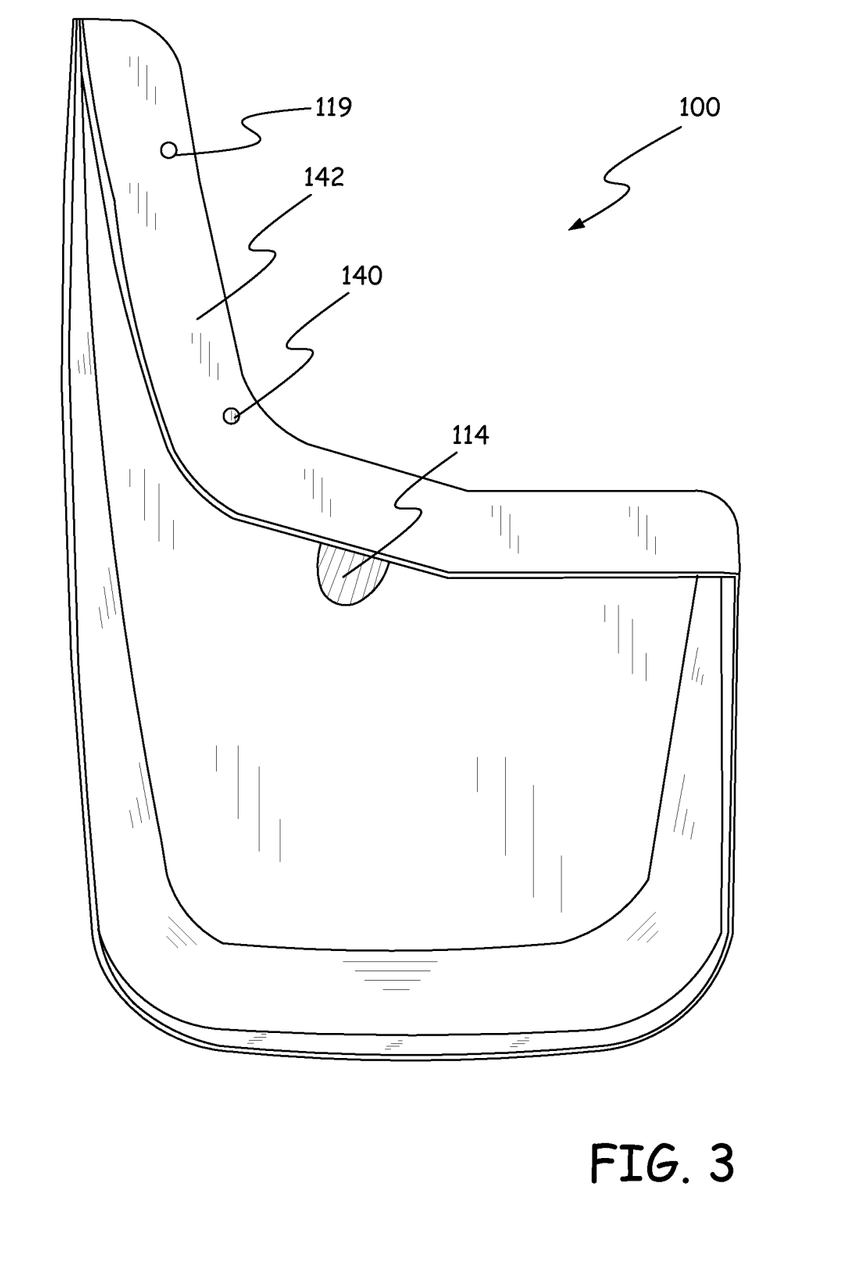
FIG. 3 is a front view of the mud flap of FIG. 1.
Figure 4:
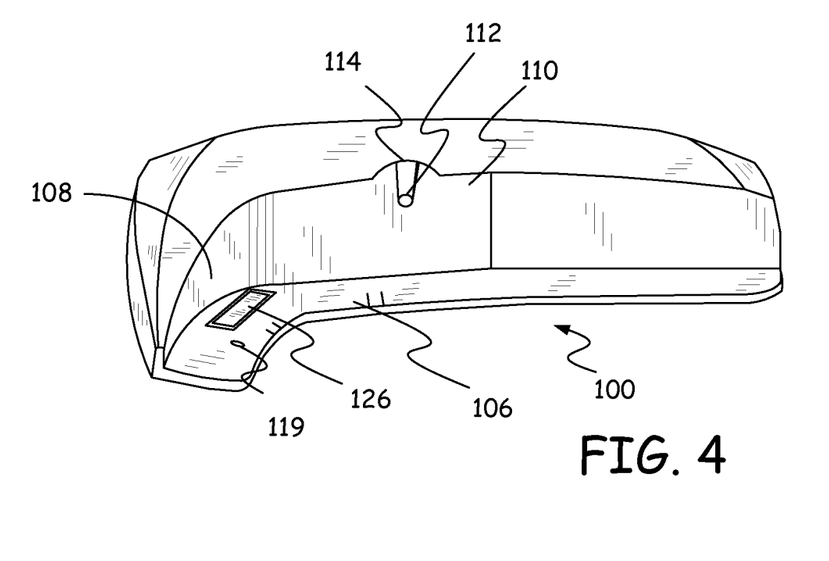
FIG. 4 is a top view of the mud flap of FIG. 1.

Exposed surface 142, on the opposite side from vertical mounting surface 106 includes a drill hole marking 140 that designates where an additional hole can be drilled through the mud guard and the fender if desired. Marking 140 is formed as a circular recess in exposed surface 142 and does not pass through mud guard 100. Because marking 140 is not a through-hole, water and small debris will not pass through marking 140 if the customer chooses to not drill any additional holes. This reduces the opportunity for debris and water to damage or corrode the fender.

FIGS. 8-14 provide a back-top perspective view, back view, front view, top view, bottom view, left side view and right side view, respectively, of a second embodiment of a mud flap or mud guard 800. Mud guard 800 includes a mounting region 802 and a projection region 804. Mounting region 802 includes a forward vertical mounting surface 806, a side vertical mounting surface 808 and a lateral mounting surface 810 that are each designed to face and contact a fender on a vehicle when mud guard 800 is installed on the vehicle. Projection region 804 is the portion of mud guard 800 that extends down and outward from the vehicle when mud guard 800 is mounted to the vehicle.

Vertical mounting surface 806 includes through-hole 819, two clip regions 820 and 822, a first recess 824, a first foam tape 826, a second recess 825, and a second foam tap 827. Through-hole 819 corresponds to a hole in the fender provided by the manufacturer of the vehicle and can receive a fastener to mount mud guard 800 to the fender. Clip region 820 is marked by raised lines 828 and 830 and clip region 822 is marked by raised lines 832 and 834. Clip regions 820 and 822 designate the general location for clips on the mud guard. Although raised lines 828, 830, 832 and 834 are shown on vertical mounting surface 806, the clips, described below, do not contact vertical mounting surface 806 but instead contact exposed surface 842 (FIG. 10), which is on the opposite side of mud guard 800 from vertical mounting surface 806.

Foam tapes 826 and 827 are each a compressible foam with a layer of adhesive on each of two opposing sides. One layer of adhesive bonds the foam tape to vertical face 806 and the other layer of adhesive bonds to the fender. As discussed further below, when mud guard 800 is mounted to a fender, foam tapes 826 and 827 provide a countering force to the clips used to hold the mud guard on the fender and thereby improve the holding ability of the clips over time.

Figure 10:
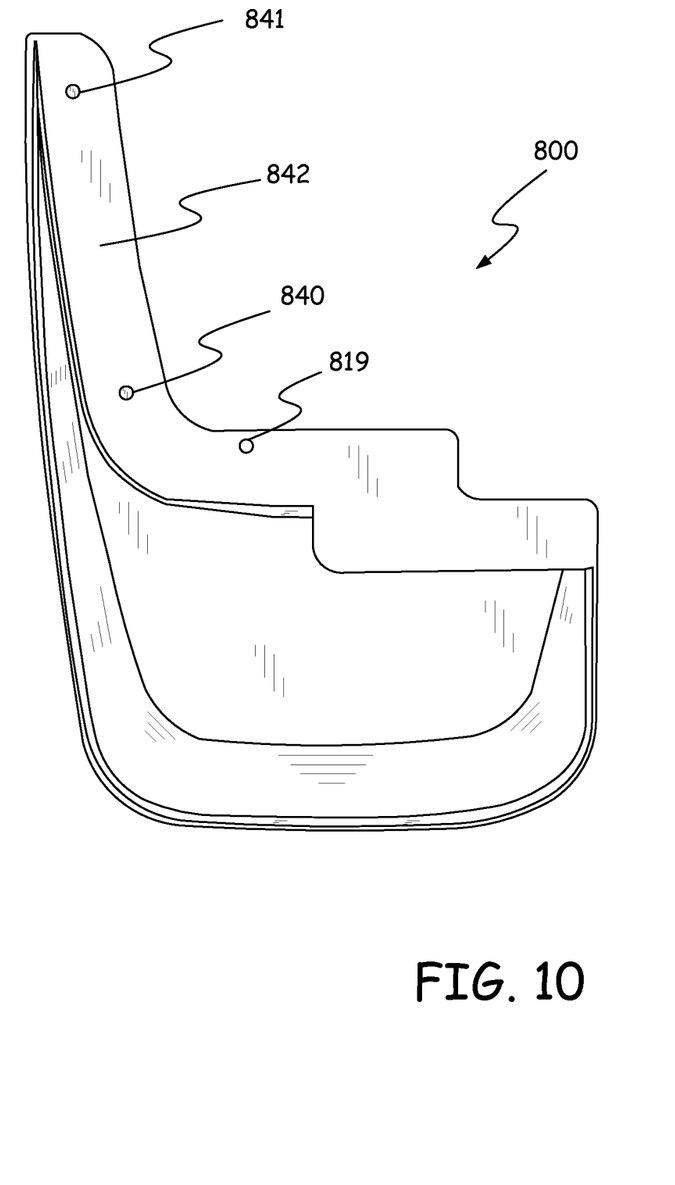
FIG. 10 is a front view of the mud flap of FIG. 8.
Figure 11:
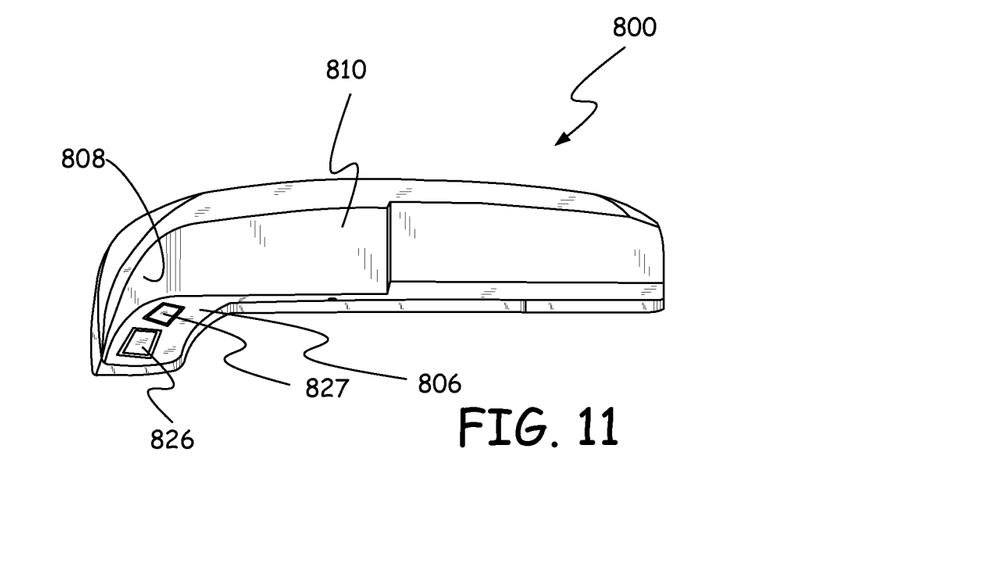
FIG. 11 is a top view of the mud flap of FIG. 8.
Figure 12:
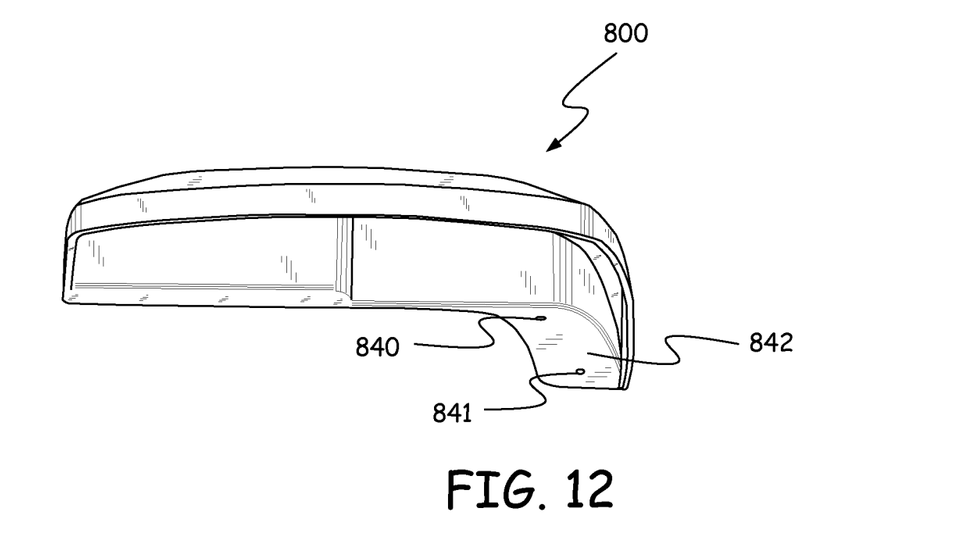
FIG. 12 is a bottom view of the mud flap of FIG. 8.
Figure 13:
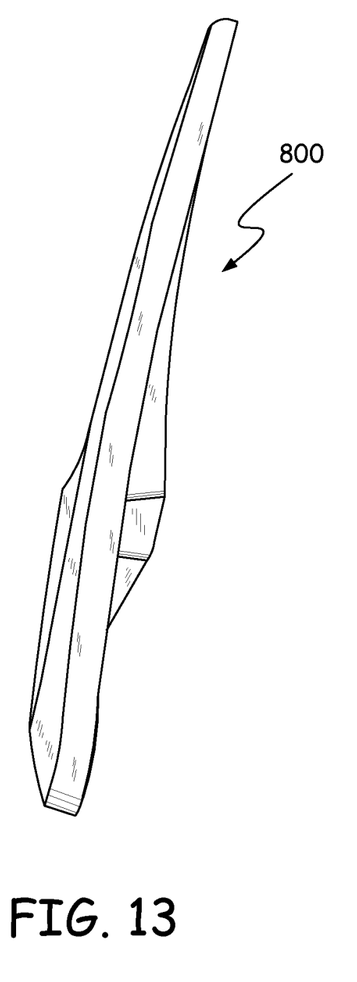
FIG. 13 is a left-side view of the mud flap of FIG. 8.
Figure 14:
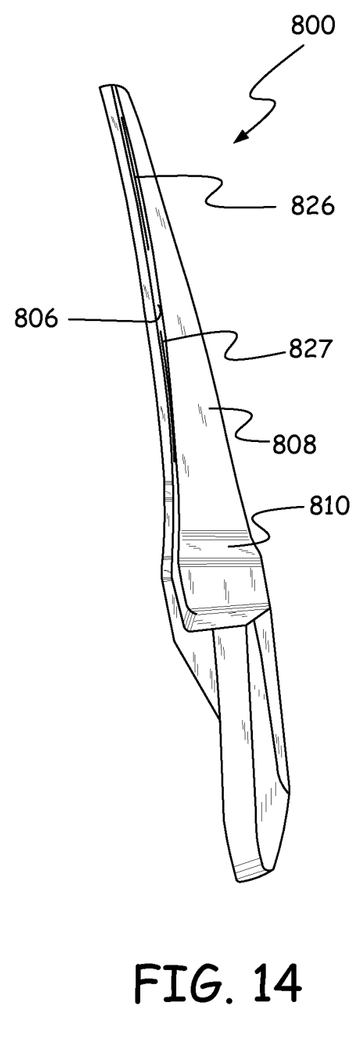
FIG. 14 is a right-side view of the mud flap of FIG. 8.

Exposed surface 842, on the opposite side from vertical mounting surface 806, includes drill hole markings 840 and 841 that designate where additional holes can be drilled through the mud guard and the fender if desired. Markings 840 and 841 are formed as circular recesses in exposed surface 842 and do not pass through mud guard 800. Because markings 840 and 841 are not through-holes, water and small debris will not pass through markings 840 and 841 if the customer chooses to not drill any additional holes. This reduces the opportunity for debris and water to damage or corrode the fender.

Figure 15:
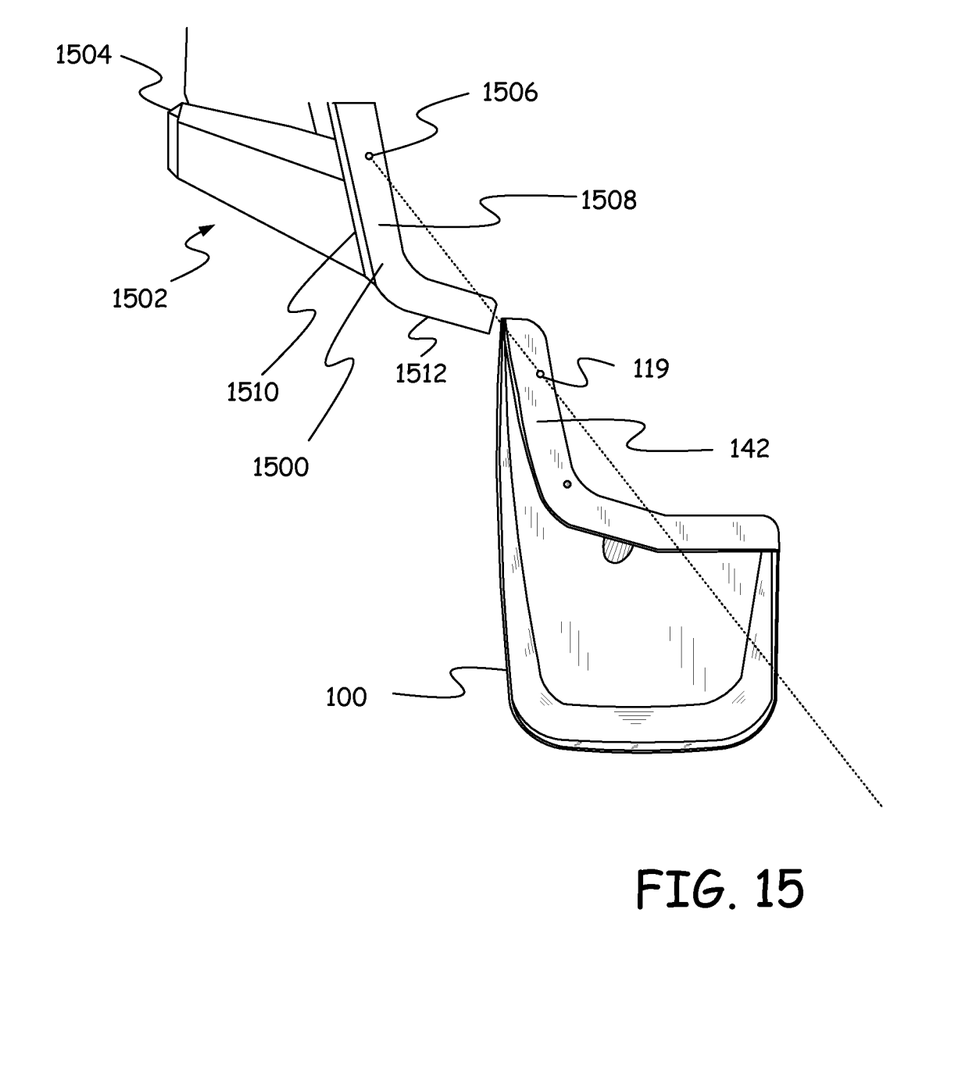
FIG. 15 shows a front view of a mud guard and a portion of a fender.

FIG. 15 shows a font view of mud guard 100 and a portion of a fender 1500 of a vehicle 1502 to indicate how mud guard 100 is positioned on vehicle 1502. In FIG. 15, the rear 1504 of vehicle 1502 is shown and the portion of fender 1500 that is displayed is at the back of the rear wheel well of vehicle 1502. As shown, mud guard 100 is mounted to fender 1500 such that through-hole 119 aligns with a through-hole 1506 in fender 1500. In addition, the shape of vertical mounting surface 106 matches the shape of a vertical surface 1508 on fender 1500. Similarly, the shapes of vertical mounting surface 108 and lateral mounting surface 110 match a vertical side surface 1510 and lateral bottom surface 1512 of fender 1500.

Figure 16:
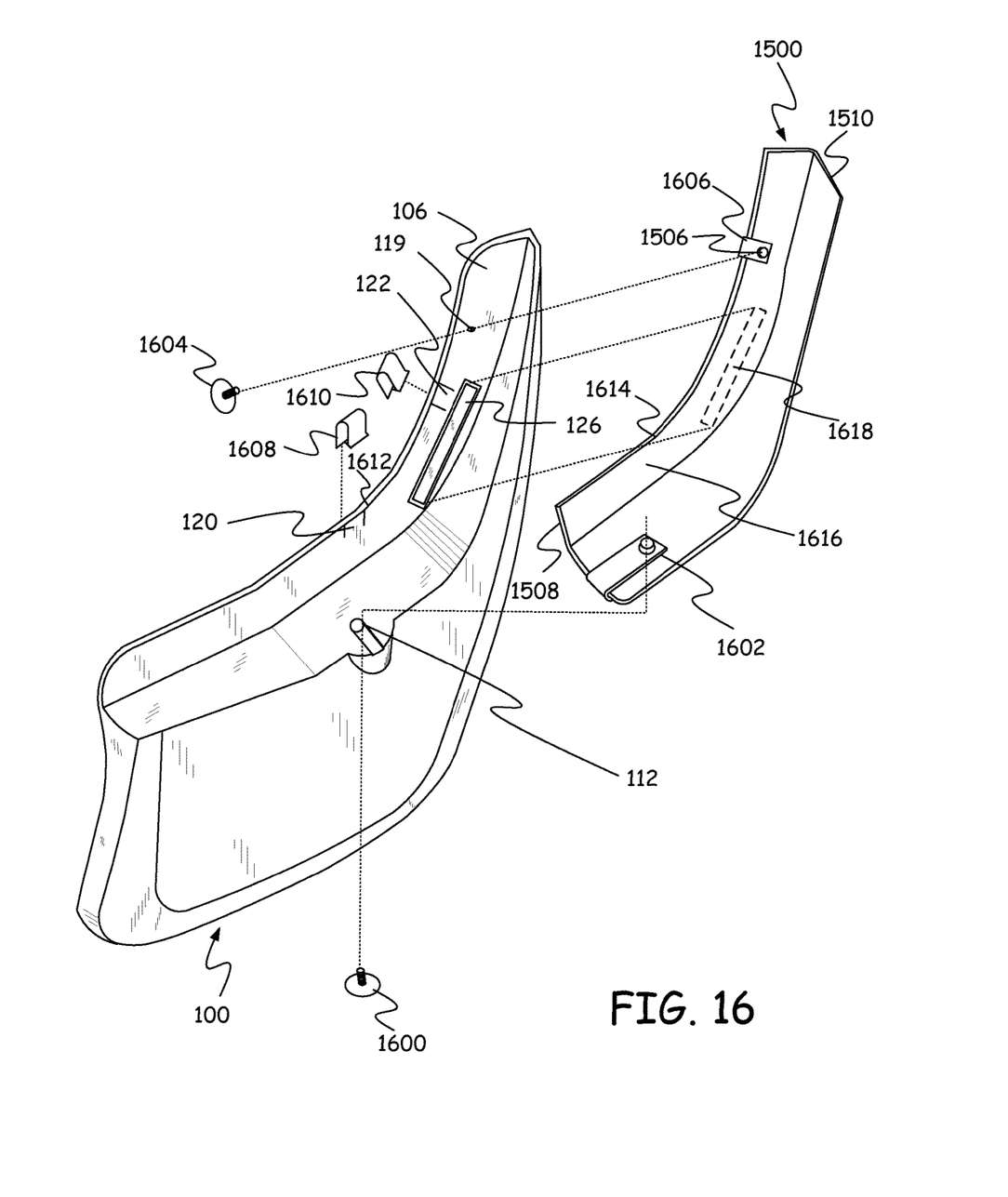
FIG. 16 is an exploded view of the mud guard of FIG. 1 mounted to a fender.

FIG. 16 shows an exploded back perspective view for attaching mud guard 100 to fender 1500. A bolt 1600 passes into through-hole 112 in lateral surface 110 of mud guard 100 and is threaded into a clip nut 1602 that is clipped to the bottom of fender 1500. Clip nut 1602 includes a threaded hole that is aligned with a hole in fender 1500. Similarly, a bolt 1604 passes into through-hole 119 in vertical mounting surface 106 of mud guard 100 and is threaded into a clip nut 1606 that is clipped onto the front surface 1508 of fender 1500. Clip nut 1606 includes a threaded hole that is aligned with hole 1506 in fender 1508.

Two spring clips 1608 and 1610 are clipped over edge 1612 of mud guard 100 and edge 1614 of fender 1500 so as to press mounting surface 106 of mud guard 100 toward surface 1508 of fender 1500. Thus, spring clips 1608 and 1610 contact exposed surface 142 of mud guard 100 and back surface 1616 of fender 1500. In accordance with one embodiment, clips 1608 and 1610 include one or more barbs designed to partially penetrate mud guard 100 to keep clips 1608 and 1610 in place.

Foam tape 126 adheres to surface 1508 of fender 1500 at location 1618 indicated by dotted lines. Surface 1508 and mounting surface 106 compress foam tape 126 through the force applied by clips 1608 and 1610 and fastener 1604.

Figure 17:
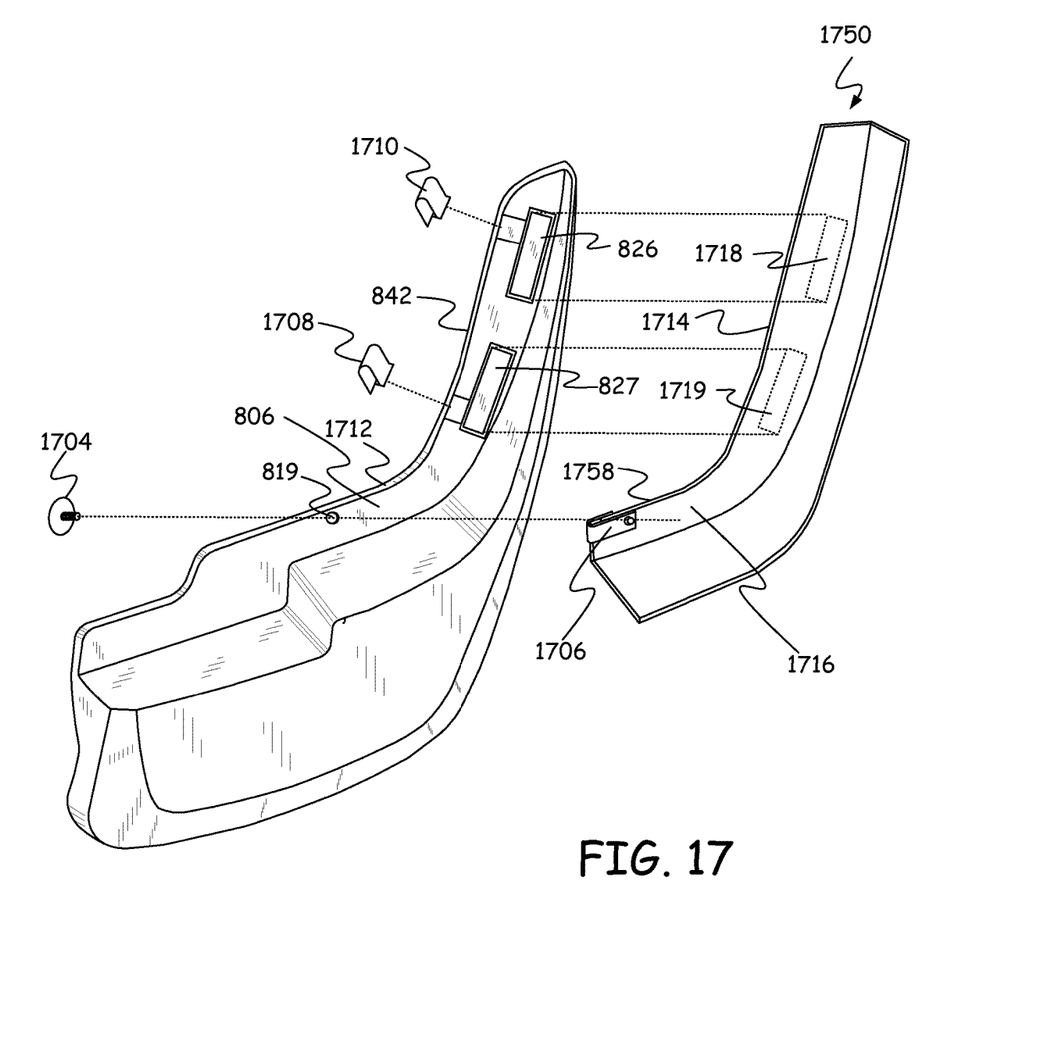
FIG. 17 is an exploded view of the mud guard of FIG. 8 mounted to a fender.

FIG. 17 shows an exploded back perspective view for attaching mud guard 800 to a fender 1750. A bolt 1704 passes into through-hole 819 in vertical mounting surface 806 of mud guard 800 and is threaded into a clip nut 1706 that is clipped onto a front surface 1758 of fender 1750. Clip nut 1706 includes a threaded hole that is aligned with a hole (not shown) in fender 1750.

Two spring clips 1708 and 1710 are clipped over edge 1712 of mud guard 800 and edge 1714 of fender 1750 so as to press mounting surface 806 of mud guard 800 toward surface 1758 of fender 1750. Thus, spring clips 1708 and 1710 contact exposed surface 842 of mud guard 800 and back surface 1716 of fender 1750. In accordance with one embodiment, clips 1708 and 1710 include one or more barbs designed to partially penetrate mud guard 800 to keep clips 1708 and 1710 in place.

Foam tapes 826 and 827 adhere to surface 1758 of fender 1750 at locations 1718 and 1719 indicated by dotted lines. Surface 1758 and mounting surface 806 compress foam tapes 826 and 827 through the force applied by clips 1708 and 1710 and fastener 1704.

Figure 1:
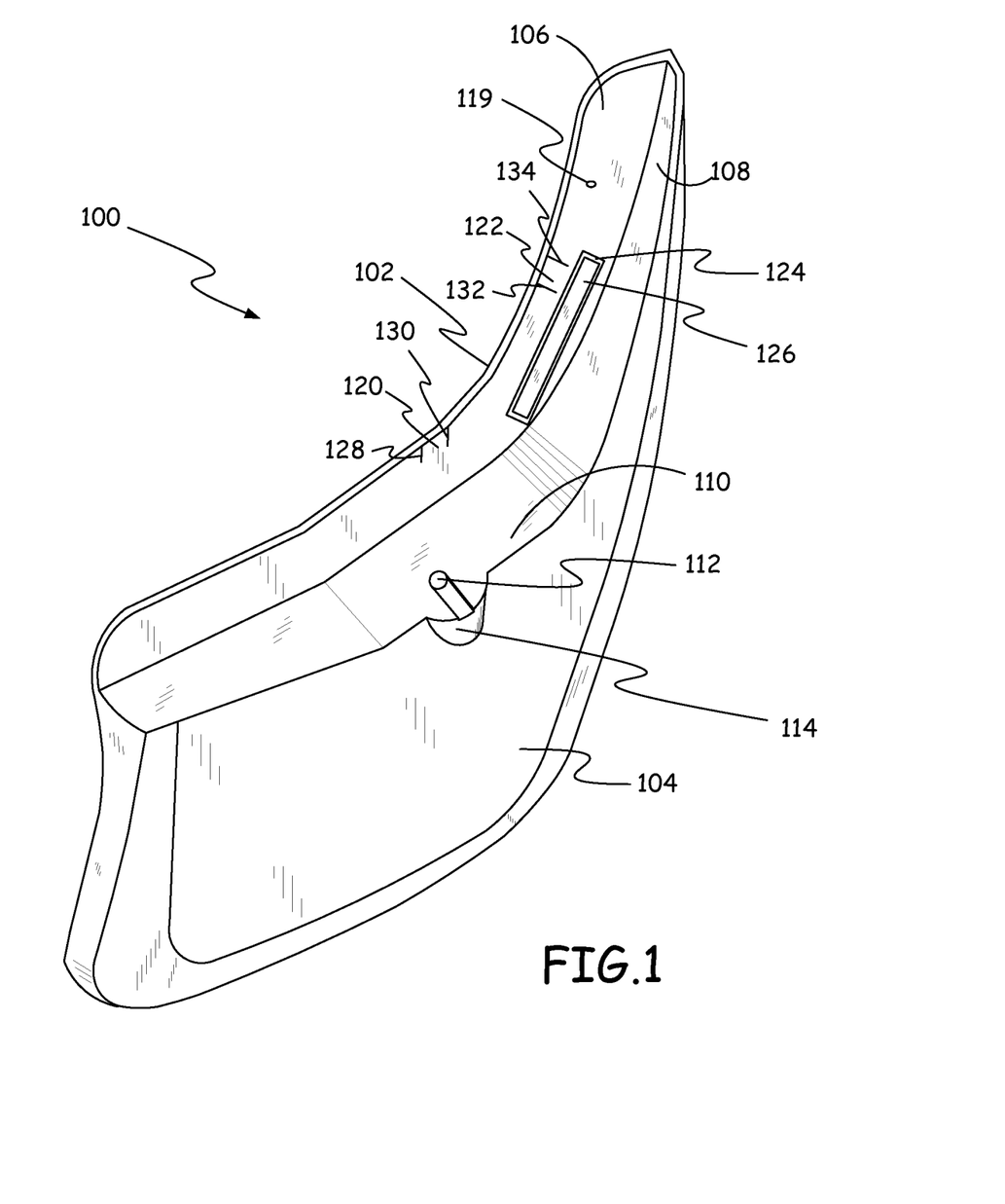
FIG. 1 is a back-top perspective view a mud flap in accordance with one embodiment.
Figure 2:
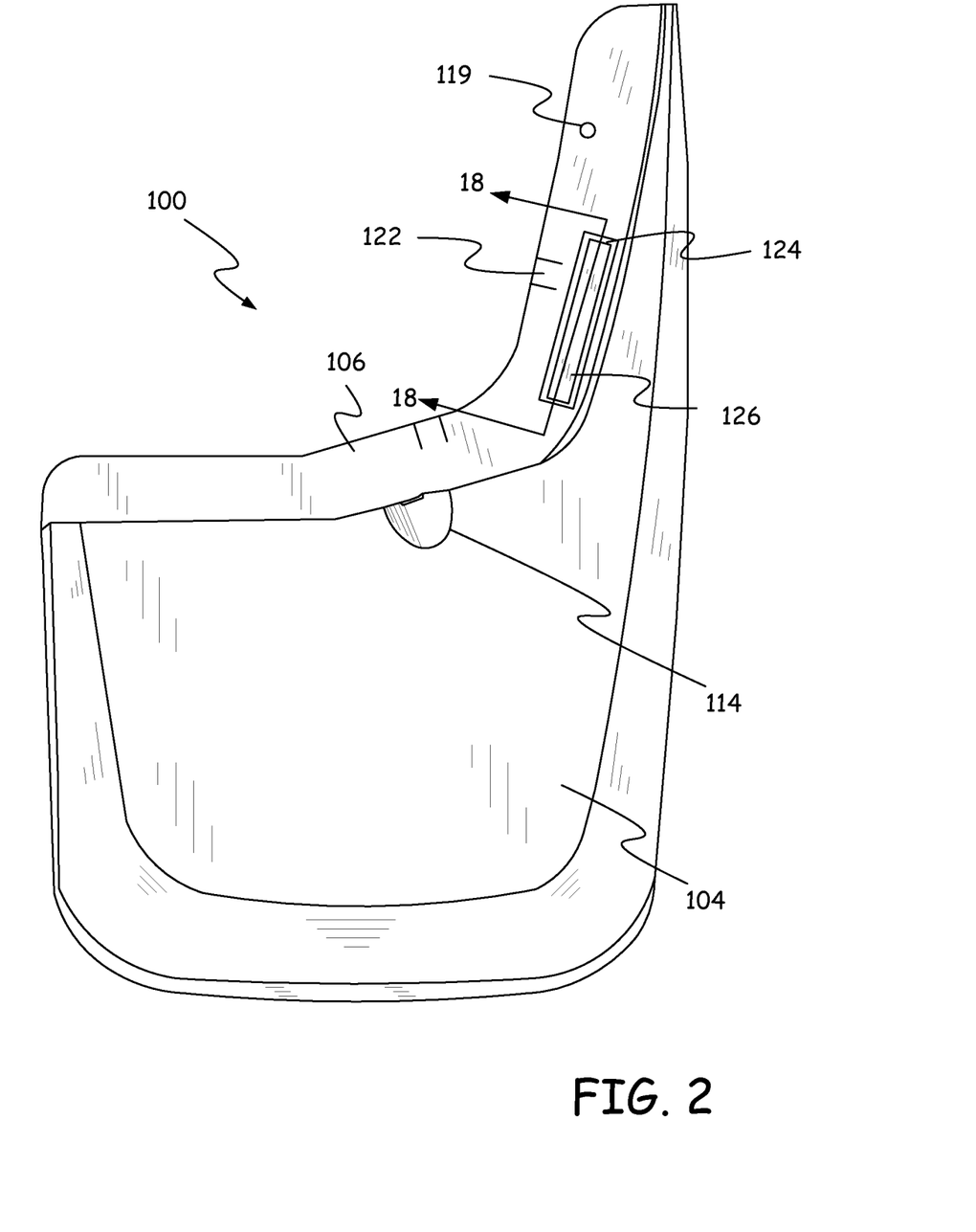
FIG. 2 is a back view of the mud flap of FIG. 1.
Figures 18, 19:
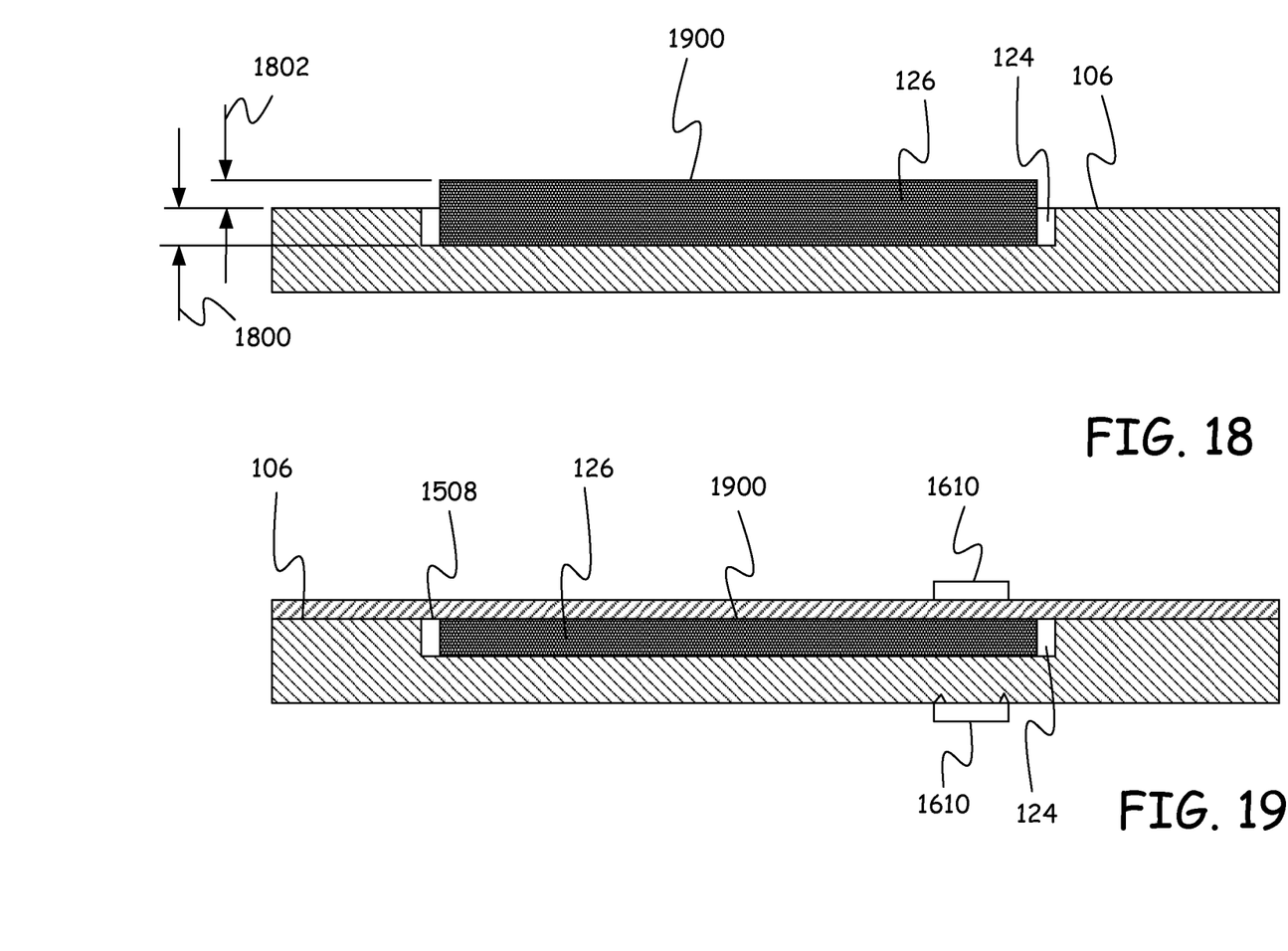
FIG. 18 is a sectional view of a portion of the mud guard of FIG. 1.
FIG. 19 is a sectional view of the portion of the mud guard of FIG. 18 mounted to a fender.

FIG. 18 provides a sectional view of a portion of mud guard 100 taken along the lines indicated in FIG. 2. FIG. 18 shows foam tape 126 positioned in recess 124. Recess 124 has a depth 1800 and foam tape 126 extends a height 1802 above surface 106 of mud guard 100. FIG. 19 provides a sectional view of the same area of mud guard 100 that is shown in FIG. 18 as it appears when mounted to fender 1500. As shown in FIG. 19, foam tape 126 has been compressed such that mounting surface 106 of mud guard 100 contacts surface 1508 of fender 1500 and an outer surface 1900 of foam tape 126 is level with mounting surface 106. If recess 124 were not provided, mounting surface 106 would be separated from surface 1508 by the space occupied by foam tape 126. Thus, recess 124 allows mounting surface 106 to contact 1508. In addition, in the state shown in FIG. 19, foam tape 126 provides a counteracting force to the compression force of clip 1610 because foam tape 126 provides an outward spring force when compressed. This force keeps clip 1610 in tension to help reduce the likelihood that clip 1610 will dislodge from mud guard 100 and fender 1500. Foam tapes 826 and 827 operate in a similar manner.

Although the present invention has been described with reference to preferred embodiments, workers skilled in the art will recognize that changes may be made in form and detail without departing from the spirit and scope of the invention.

What is claimed is:

1. A mud flap assembly comprising:
    a mud flap with a mounting surface and an exposed surface, the exposed surface on an opposite side of the mud flap from the mounting surface;
    a foam tape adhesively mounted to the mounting surface; and
    a spring clip that contacts the exposed surface of the mud flap when the mud flap is mounted to a vehicle so as to compress the foam tape;
    wherein the mud flap further comprises a recess in the mounting surface and the foam tape is positioned within the recess.

2. The mud flap assembly of claim 1 further comprising a second spring clip that contacts the exposed surface when the mud flap is mounted to the vehicle.

3. The mud flap assembly of claim 1 wherein the mud flap further comprises a through-hole and the mud flap assembly further comprises a fastener that passes into the through-hole when the mud flap is mounted to the vehicle.

4. The mud flap assembly of claim 1 further comprising a marking indicating a location for a clip to be applied to the mud flap.

5. The mud flap assembly of claim 1 wherein the recess has a depth such that when the mud flap is mounted to the vehicle the mounting surface contacts the vehicle and an outer surface of the foam tape is level with the mounting surface.

6. The mud flap assembly of claim 1 wherein the exposed surface of the mud flap further comprises a drill hole recess marking a position for drill hole.

7. The mud flap assembly of claim 1 wherein the clip comprises at least one barb.

8. A mud flap comprising:
    a mounting surface;
    a recess in the mounting surface; and
    foam tape located in and adhered to the recess such that an outer surface of the foam tape is above the mounting surface.

9. The mud flap of claim 8 further comprising a marking indicating a location for a clip to be applied to the mud flap.

10. The mud flap of claim 8 wherein the foam tape is compressible such that when compressed the outer surface of the foam tape is aligned with the mounting surface.

11. The mud flap of claim 8 wherein the foam tape further comprises adhesive on the outer surface of the foam tape.

12. The mud flap of claim 8 further comprising recesses indicating the locations for holes to be drilled in the mud flap.

13. The mud flap of claim 8 further comprising at least one through-hole corresponding to a through-hole in a vehicle.

14. The mud flap of claim 8 wherein the mud flap comprises a plurality of recesses each recess having a respective piece of foam tape.

15. A method comprising:
    adhering a mud flap to a vehicle using foam tape positioned between the mud flap and the vehicle;
    applying a spring clip to the mud flap and the vehicle such that the spring clip is in tension and the foam tape is compressed; and
    drilling a hole through the mud flap and a hole through a portion of the vehicle by drilling at a location marked by a drill hole recess on the mud flap.

16. The method of claim 15 wherein the foam tape is positioned in a tape recess of the mud flap.

17. The method of claim 16 wherein when the spring clip is applied to the mud flap and the vehicle, an outer surface of the compressed foam tape is aligned with a mounting surface of the mud flap.

18. The method of claim 15 further comprising inserting a fastener through the hole in the mud flap and the hole in the vehicle.

19. The method of claim 15 further comprising affixing the spring clip at a marking of the mud flap indicating a location for the spring clip to be applied to the mud flap.

20. The method of claim 15 wherein the spring clip comprises at least one barb.

* * * * *

UNITED STATES PATENT AND TRADEMARK OFFICE
CERTIFICATE OF CORRECTION

PATENT NO.         : 10,252,753 B2
APPLICATION NO.    : 15/621428
DATED              : April 9, 2019
INVENTOR(S)        : Kenneth Douglas Johnson Page 1 of 1

It is certified that error appears in the above-identified patent and that said Letters Patent is hereby corrected as shown below:

In the Claims

Column 6, Claim 6, Line 8, after "for", insert --a--

Signed and Sealed this
Sixteenth Day of July, 2019

Andrei Iancu
*Director of the United States Patent and Trademark Office*